March 24, 1931.  R. R. DOWNIE  1,797,642
EXCAVATOR SCOOP
Filed Nov. 29, 1926  2 Sheets-Sheet 1

Inventor:
Robert Rex Downie.
Emery, Booth, Janney & Varney, Attys.

March 24, 1931.  R. R. DOWNIE  1,797,642
EXCAVATOR SCOOP
Filed Nov. 29, 1926    2 Sheets-Sheet 2
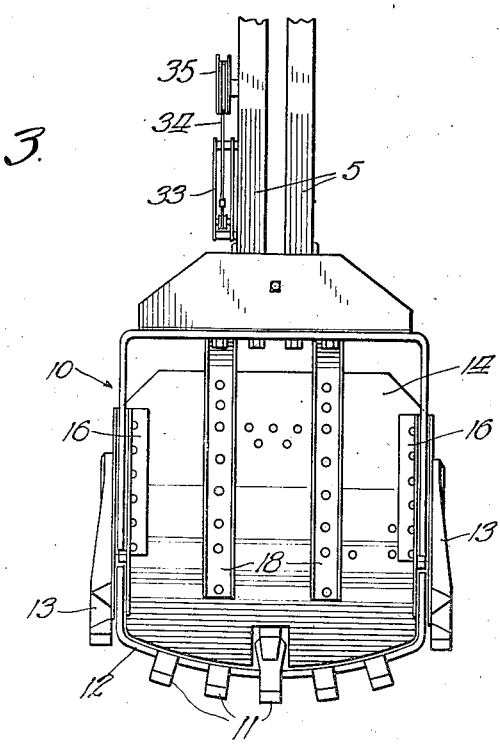
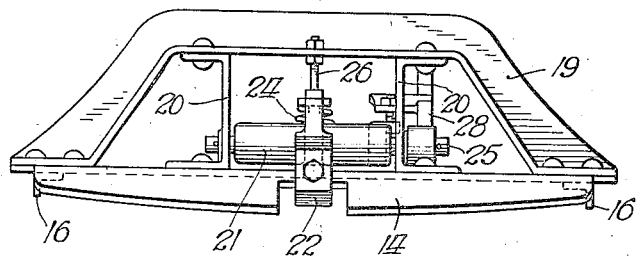
Inventor
Robert Rex Downie Patented Mar. 24, 1931

1,797,642

UNITED STATES PATENT OFFICE

ROBERT REX DOWNIE, OF BEAVER FALLS, PENNSYLVANIA, ASSIGNOR TO KEYSTONE DRILLER COMPANY, A CORPORATION OF PENNSYLVANIA

EXCAVATOR SCOOP

Application filed November 29, 1926. Serial No. 151,350.

This invention relates to excavating machines of the type described and claimed in my Patent No. 1,511,114, and among other objects aims to strengthen particularly the rear or closed end of the excavator scoop so that it may withstand the stresses set up when the scoop is dropped upon hard material to break or dislodge it.

The invention may be understood by reference to one illustrative embodiment shown in the accompanying drawings, in which:

Fig. 3 is an elevation of the scoop looking from the open end; and

Fig. 4 is substantially a bottom plan view showing the end plate of the scoop and the means for bracing it, as well as portions of the bottom latching mechanism.

Figure 2:
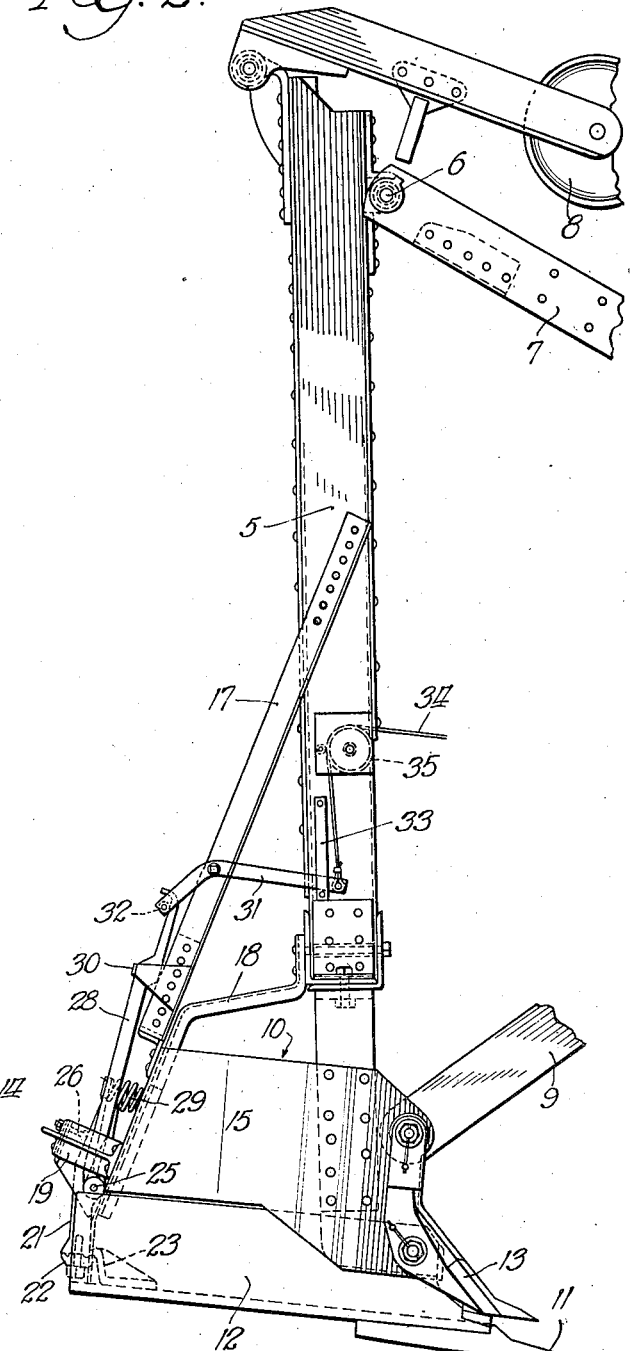
Fig. 2 is a side elevation of the same, showing in addition portions of the boom and of the stick operating mechanism.

Referring more specifically to the drawings, as shown in Fig. 2 the ditcher stick 5 is pivoted as at 6 on boom 7 and is moved in opposite directions on its pivot by power actuated lines (not shown) connected respectively to a sheave 8 at the upper end of the ditcher stick and to a hauling bail 9 attached to an excavator scoop 10 fixed to the lower end of the ditcher stick. The scoop has the usual excavating teeth 11 and a dumping bottom 12 which carries the teeth at its pivoted end, and which is latched at its swinging end by means to be described. At the sides of the scoop, side rake teeth 13 are carried; these are described and claimed in copending applications. By suitable manipulation of the two power-actuated lines, the ditcher stick and boom are swung about their respective pivotal axes to cause the scoop to excavate and to move into dumping position. The normal operation of the machine is disclosed in the patent referred to and will not be further described.

As disclosed in said patent, when excavating machines of the designated type start digging, the ditcher stick and scoop are extended outwardly from the machine until the ditcher stick is nearly in alinement with the boom and the teeth of the scoop are substantially vertical and have their points directed downwardly. If the material being excavated is not extremely hard and compact, the downward movement of the scoop under power is sufficient to effect excavation; but if the work is being done in certain regions, boulders and strata of rock and the like are encountered which make it impossible to continue excavation until the obstructions have been removed. It frequently happens that the obstructions are of such a nature or are so located that recourse to dynamiting is not expedient or possible for many reasons, one of which is the fact that the excavation and the effects thereof usually must be confined within certain very definite areas because of property rights, highways, easements and the like. Hence it becomes highly advantageous to provide the excavating machine with a scoop which is so built that it may be used like a pick to strike the obstruction so as to dislodge it or break it into fragments, and which may then proceed with the normal work of excavation.

When a machine of the described type is used for delivering blows against hard material, the ditcher stick and boom, both of which support the scoop, are permitted to fall with the scoop by suddenly releasing the upper power line. The aggregate weight of the structure which thus falls is very considerable and the falling mass will acquire a tremendous momentum in a drop of say ten feet. When the teeth strike the obstruction, the fall of the structure is suddenly halted and the resulting impact is terrific. Deformative and destructive stresses are set up in all parts of the scoop, as well as in the scoop supporting members and the various pivotal connections. In a copending application I have described and claimed a scoop having a dumping bottom and pivotal connections designed to withstand the heavy stresses set up by hammer blows of the scoop.

When the scoop is used to deliver blows, it has been found that the end plate of the scoope (which is substantially at right angles to the path of the scoop in falling), is subjected to momentary stresses which cause very severe distortion of the plate, particularly at and near its middle, where the latch for the bottom is carried. These momentary distortions arise because of the momentum of the end plate, and occur much too rapidly to be seen, but their effects are readily observable and include frequent breakage of the latch springs, as well as damage to other parts of the latch and its operating mechanism, and also occasionally permanent distortion of the end plate, making it impossible to close or latch the bottom. The present invention provides means for bracing and reinforcing the end plate of the scoop so that permanent distortion of the end plate is substantially obviated, while vibration of the end plate is reduced to such an extent that the latch springs are not destroyed and the latch is not rendered inoperative.

Referring to Fig. 3, the end plate 14 of the scoop is secured to the side plates 15 by angles 16. Primarily to make the connection of scoop 10 with the ditcher stick more rigid and stronger, one or more angle bars 17 (Fig. 2) are secured at their upper ends to the ditcher stick near the middle thereof and at their lower ends to the upper part of the end plate 14, which preferably projects above the sides of the scoop as shown. The scoop braces 17 form with the ditcher stick and scoop what are in effect two adjacent triangular trusses and cooperate with parts to be described to overcome the destructive effects of hammer blows of the scoop.

Also secured to the end plate are two channel bars 18 which, as shown in Fig. 3, may extend along the inner face of the end plate for the greater part of the height thereof and which are bent at their upper ends so as to extend over the top of the scoop and converge to the lower end of the ditcher stick where they are secured. The two bars 18 prevent distortion or substantial vibration of the upper part of the end plate, particularly in cooperation with the scoop braces 17, support the end plate and the footing of the scoop braces 17 from caving toward the front end of the scoop, and also stiffen the entire central portion of the end plate, without interfering in the slightest with dumping of the load.

To take the spring out of the mid portion of the end plate, a truss member 19 is rigidly secured to the end plate on the outside thereof. In the illustrative embodiment a T-bar is bent to a more or less arch form as best shown in Fig. 4, and is riveted at its ends to the end plate, being connected at intermediate points by short channel members 20 with the mid portion of the end plate, said channel members forming ties. The truss member 19 extends the full width of the scoop body and lies in a plane substantially perpendicular to the principal plane of the end plate, being equidistant at its ends from the top of the scoop but preferably somewhat nearer the bottom than the top. Between the truss bar and the end plate, portions of the bottom latching mechanism are carried so as to be protected so far as possible. When the scoop delivers a blow, a compression stress is developed in the truss bar, and tension is developed in the ties 20, and the tensile strength of the end wall is availed of. The described truss bar lies wholly outside of the scoop body and hence does not interfere in any way with dumping of the material.

Figure 1:
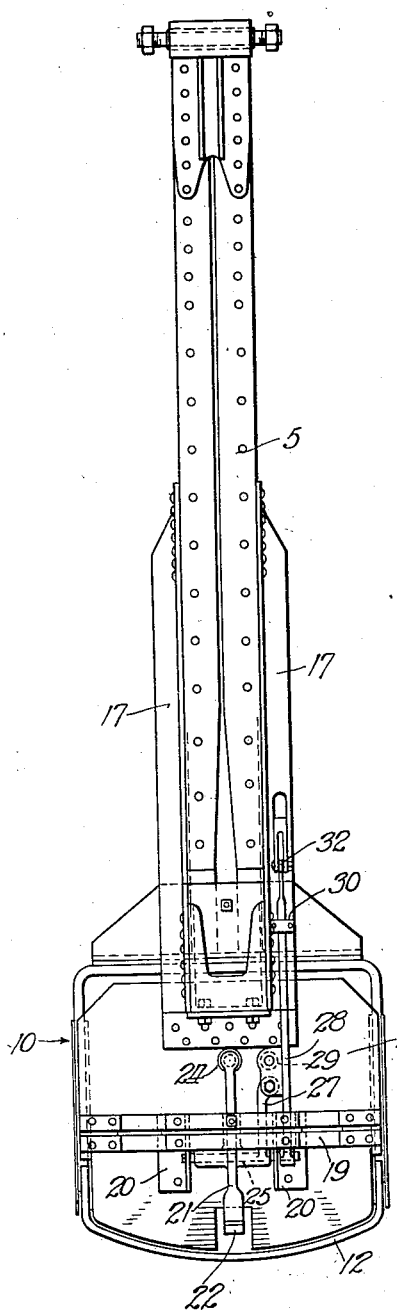
Fig. 1 is an elevation of a ditcher stick and scoop looking from the rear end.

The latching means for the dumping bottom may take various forms. In the drawings, Figs. 1, 2 and 4, I have shown a pivoted latch 21 having a detachable nib 22 engaging a latch piece 23 secured to the dumping bottom, the latch spring 24 (Fig. 1) being interposed between the upper end of the latch and the end plate. The latch pivot 25 extends between and is secured to the two channel members 20 which form ties between the truss bar and the end plate, and is therefore held rigidly. A set screw 26 serves as an adjustable stop for the latch 21 and aids in regulating the engagement between the latch and latch piece. The latch operating means consists of an arm 27 secured to the latch and extending in the path of a latch operating lever 28 which is normally moved into position of Fig. 2 by a coil spring 29, a stop member 30 preventing further outward movement of the latch lever. The upper end of the latch lever is operated by a bell crank lever 31 having a roller 32 at the lower end engaging the latch lever and being pivoted to one of the scoop braces 17. The other end of the bell crank lever moves in a guide 33 carried on the side of the ditcher stick, and a latch operating cord 34 secured to the bell crank lever is guided over a sheave 35 on the ditcher stick and extends thence to the operator's cab (not shown) in convenient position to be pulled so as to release the dumping bottom and permit gravity discharge of the load.

From the above, it will be clear that the latch and latch springs, as well as the latch operating mechanism, are protected against possible damage, not only that arising from vibration or distortion of the end plate, but also damage from direct blows, as in the backward sweep of the scoop during excavation. Furthermore, the latch and its operating mechanism are so designed that the momentum of the parts is reduced to a minimum and is ineffective to cause unlatching when the scoop is used to deliver blows repeatedly upon hard material.

While two channel members 20, two channel bars 18 and two scoop braces 17 are shown in the drawings, and are preferably used for manufacturing reasons, equal strength and rigidity may be secured by replacing any pair of these braces with a single heavier brace.

Hence the appended claims for the most part are not limited to pairs of braces.

Obviously the present invention is not restricted to the particular embodiment thereof herein shown and described. Moreover, it is not indispensable that all the features of the invention be used conjointly since they may be employed advantageously in various combinations and sub-combinations.

What is claimed is:

1. An excavating scoop comprising, in combination, a body having a plate closing one end thereof; and a truss bar bridging the end plate and secured thereto at its ends and at an intermediate point.

2. An excavating scoop comprising, in combination, a body having a plate closing one end thereof; and a truss bar bridging the end plate and secured thereto at spaced points and lying outside of the body so as to be put out of contact with the material during excavation and dumping.

3. An excavating scoop comprising, in combination, a body having a plate closing one end thereof; and a truss bar bridging the end plate and secured thereto at spaced points outside the scoop; said truss bar extending from one side of the scoop to the other and lying in a plane which is nearer the bottom of the scoop than the top thereof.

4. An excavating scoop comprising, in combination, a body having a bottom pivoted at one end for dumping, a plate closing the scoop body at the end opposite to the pivoted end of the bottom; a truss bar secured to the end plate outside the scoop body; a bottom latching mechanism including a spring actuated latch carried by said end plate outside the scoop; and connections between the truss bar and the end plate; the latch being pivoted on said connections.

5. An excavating scoop comprising, in combination, a body having a bottom pivoted at one end for dumping, a plate closing the scoop body at the end opposite to the pivoted end of the bottom; a truss bar secured to the end plate outside the scoop body; and a bottom latching mechanism including a spring actuated latch carried by said end plate; and a bar connecting the intermediate portion of the truss bar with the end plate, the truss bar preventing any substantial distortion of the end plate, whereby the destructive effects of such distortion are substantially obviated.

6. An excavating machine comprising, in combination, a ditcher stick; a scoop rigidly secured to the lower end of the ditcher stick; excavating teeth at one end of the scoop; a plate closing the opposite end of the scoop; a truss bar secured outside the scoop to the end plate and lying intermediate the top and bottom of the scoop; and bars secured to the end plate inside of the scoop and extending above the top of the scoop and extending down as far as the truss bar to the lower end of the ditcher stick, and there secured, the bars and truss bar co-operating to hold the end plate rigidly.

7. An excavating machine comprising, in combination, a ditcher stick; a scoop rigidly secured to the lower end of the ditcher stick; excavating teeth at one end of the scoop; a plate closing the opposite end of the scoop; bracing means secured to the end plate and ditcher stick, to minimize distortion and vibration particularly at the upper end of the end plate; and a truss reinforcement secured to the end plate outside of the scoop, and serving to prevent distortion particularly in the middle of the end plate.

8. An excavating machine comprising, in combination, a ditcher stick; a scoop rigidly secured to the lower end of the ditcher stick; excavating teeth at one end of the scoop; a plate closing the opposite end of the scoop; a scoop brace secured to the end plate and to the ditcher stick to form with the scoop and ditcher stick a triangular truss; and means secured to the end plate to minimize distortion thereof.

9. An excavating machine comprising, in combination, a ditcher stick; a scoop rigidly secured to the lower end of the ditcher stick; excavating teeth at one end of the scoop; a plate closing the opposite end of the scoop; bracing means secured to the end plate and to the lower end of the ditcher stick; and a reinforcing structure secured to the end plate outside of the scoop and cooperating with the aforesaid bracing means to hold the end plate against vibration and prevent permanent distortion from hammer blows of the scoop.

10. An excavating machine comprising, in combination, a ditcher stick; a scoop; a bail rigidly secured to the sides of the scoop and to the lower end of the ditcher stick; said scoop having an end plate; a brace connecting the upper part of the end plate with a mid point of the ditcher stick; a brace connecting the end plate with the lower end of the ditcher stick; and means fast to the end plate and outside of the scoop and serving to prevent permanent distortion of the end plate arising from hammer blows of the scoop.

11. An excavating machine comprising, in combination, a ditcher stick; a scoop; said scoop having a pivoted bottom for dumping, and also having a latch to secure the pivoted bottom in scoop-closing position; the scoop being rigidly secured to the lower end of the ditcher stick; a brace connecting the end plate of the scoop with the ditcher stick; means fast to the end plate outside the scoop and serving to prevent permanent distortion of the end plate; the latch being carried by said means and thereby rendered operative even though the scoop is used to deliver hammer blows against hard material.

12. An excavating scoop comprising, in combination, a body; a dumping bottom; a spring-actuated latch for the bottom; and means secured to the end wall of the body to brace the same and prevent distortion thereof, said means carrying the bottom latching means so as to obviate breakage of the latch spring.

13. An excavating scoop comprising, in combination, a body having two sides and an end plate; and means to prevent distortion of said end plate consisting of a truss bar secured at its ends to the end plate adjacent where it is secured to the sides of the scoop and bent so that its mid portion lies parallel to the plane of the end plate, with diagonal portions at acute angles relative to the end plate; and bars secured to the truss bar adjacent the points where the truss bar is bent and also to the end plate, so that when the scoop delivers a blow upon hard material, compression stresses are set up in the truss, while the bars are subjected to tension.

14. An excavating scoop comprising, in combination, a body having two sides and an end plate; and means to prevent distortion of said end plate consisting of a truss bar secured at its ends to the end plate adjacent where it is secured to the sides of the scoop and bent so that its mid portion lies substantially parallel to the plane of the end plate, with diagonal portions at acute angles relative to the end plate; and channel bars between and secured to the truss bar and to the end plate and providing ties which are substantially perpendicular to the end plate.

15. An assembly for bracing the wall of an excavating scoop comprising, in combination, a bar constructed and arranged to be fixed at its ends to said wall to form a bridge truss for the wall, spanning the wall from end to end and lying in a plane substantially perpendicular thereto; and means for rigidly securing the bridge member to the scoop wall aforesaid.

16. An excavating scoop comprising, in combination, a body having an end wall; a pivoted bottom for the body; and latch means for the pivoted bottom consisting of a latch pivoted at an intermediate point and engaging a latch piece secured to the bottom; a latch spring to maintain the latch in engagement with the latch piece; a latch arm connected with the latch at the fulcrum thereof; a latch lever pivoted at its lower end upon the end plate and constructed and arranged to engage the latch arm when rocked on its pivot; a spring arranged to maintain the latch lever normally out of contact with the latch arm; means to move the upper end of the latch lever to depress the latch arm and thereby effect releasing of the latch; and a reinforcing structure for bracing the end wall so as to minimize vibration and distortion thereof.

17. An excavating scoop comprising, in combination, a body having an end wall; a pivoted bottom for the body; and latch means for the pivoted bottom consisting of a latch pivoted at an intermediate point and engaging a latch piece secured to the bottom; a latch spring to maintain the latch in engagement with the latch piece; a latch lever pivoted at its lower end upon the end plate and constructed and arranged to disengage the latch when rocked on its pivot; a spring arranged to maintain the latch lever in inoperative relation to the latch; means to move the upper end of the latch lever to effect releasing of the latch; and a reinforcing structure surrounding the latch and bracing the end wall so as to minimize such vibration and distortion thereof as would break the latch or its spring.

In testimony whereof, I have signed my name to this specification.

ROBERT REX DOWNIE.

CERTIFICATE OF CORRECTION.

Patent No. 1,797,642.                                            Granted March 24, 1931, to

ROBERT REX DOWNIE.

It is hereby certified that error appears in the printed specification of the above numbered patent requiring correction as follows: Page 3, line 20, claim 2, strike out the word "put"; same page, lines 64 and 65, claim 6, strike out the words "and extending down as far as the truss bar" and insert the same to follow the word "scoop" in line 63, of same claim; and that the said Letters Patent should be read with these corrections therein that the same may conform to the record of the case in the Patent Office.

Signed and sealed this 26th day of May, A. D. 1931.

(Seal)                                                                     M. J. Moore,
                                                                             Acting Commissioner of Patents.